United States Patent [19]
Shimizu

[11] Patent Number: 5,695,865
[45] Date of Patent: Dec. 9, 1997

[54] AUTOMOTIVE UPHOLSTERY COMPONENTS AND METHOD FOR MAKING THE SAME

[75] Inventor: Koichi Shimizu, Kanagawa-ken, Japan

[73] Assignee: Kasai Kogyo Co., Ltd., Tokyo, Japan

[21] Appl. No.: 557,908

[22] Filed: Nov. 14, 1995

[30]     Foreign Application Priority Data

Nov. 18, 1994   [JP]   Japan ................................ 6-285585

[51] Int. Cl.⁶ ........................ B32B 7/02; B60J 5/00
[52] U.S. Cl. ................ 428/212; 428/121; 428/130; 428/172; 428/192; 428/542.2; 264/405; 264/449; 296/146.7; 156/244.17; 156/272.2
[58] Field of Search ........................ 428/156, 172, 428/192, 212, 542.2, 121, 130; 52/311.1; 264/405, 442, 449; 296/146.7; 156/242, 244.17, 272.2

[56]           References Cited

U.S. PATENT DOCUMENTS

| | | | |
|---|---|---|---|
| 4,781,956 | 11/1988 | ZimmermanN et al. | 428/172 |
| 5,064,714 | 11/1991 | Yamaguchi et al. | 428/219 |
| 5,242,738 | 9/1993 | Furuya et al. | 428/172 |
| 5,281,383 | 1/1994 | Ueki et al. | 264/259 |

FOREIGN PATENT DOCUMENTS

| | | |
|---|---|---|
| 446411 | 9/1991 | European Pat. Off. |
| 495292 | 7/1992 | European Pat. Off. |
| 514541 | 11/1992 | European Pat. Off. |
| 596597 | 5/1994 | European Pat. Off. |
| 603498 | 6/1994 | European Pat. Off. |

OTHER PUBLICATIONS

Patent Abstracts of Japan, vol. 12 No. 478 14 Dec. 1988 JP A 63 199630 (Toyota Kako KK) Abstract.
"Patent Abstracts of Japan," vol. 12, No. 478, 14 Dec. 1988.
"Patent Abstracts of Japan," vol. 10, No. 365, 6 Dec. 1986.
"Patent Abstracts of Japan," vol. 14, No. 384, 20 Aug. 1990.
"Patent Abstracts of Japan," vol. 4, No. 171, 26 Nov. 1980.

Primary Examiner—Donald Loney
Attorney, Agent, or Firm—Dickstein Shapiro Morin & Oshinsky LLP

[57]           ABSTRACT

In an automotive upholstery component including a trim main body and an ornamental sheet mounted on a selected part of the surface of the trim main body, the ornamental sheet is attached to the trim main body without using a bonding agent so that the fabrication steps may be reduced in number, the working environment may be improved, and the design characteristics of the product may be enhanced. A door trim main body is placed on an upper die for pressing which is equipped with a welder upper electrode, and the ornamental sheet is placed on the lower die for pressing which is equipped with a welder lower electrode. High frequency electric current of a prescribed voltage is applied across the upper and lower electrodes so that the ornamental sheet may be attached to a prescribed part of the surface of the door trim main body 20 over the entire area of the ornamental sheet, and the use of a bonding agent may be thereby abolished.

20 Claims, 13 Drawing Sheets

AUTOMOTIVE UPHOLSTERY COMPONENTS AND METHOD FOR MAKING THE SAME

TECHNICAL FIELD

The present invention relates to automotive upholstery components such as automotive door trims, mar side trims and so on, and a method for making the same.

BACKGROUND OF THE INVENTION

Various attempts have recently been made to improve the quality of the interior of the passenger compartment of automobiles by using higher grade materials for the upholstery components such as automotive door trims, and by attaching ornamental sheets such as fabric sheets to prescribed parts of the door trim.

Figure 16:
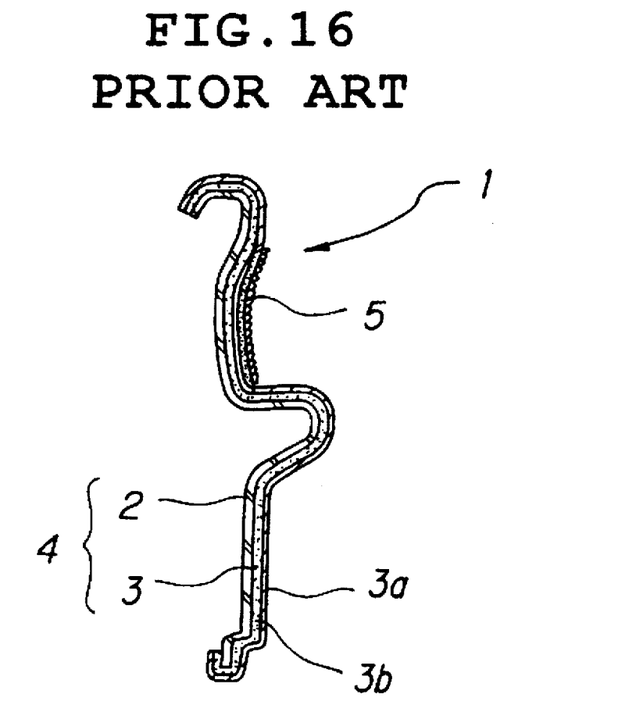
FIG. 16 is a sectional view showing the structure of a conventional automotive door trim.

FIG. 16 shows the structure of a conventional automotive door trim 1, which comprises a door trim main body 4 including a resin core member 2 molded into a prescribed shape, and a surface skin member 3 attached to the surface of the resin core member 2 in an overlying relationship, and an ornamental sheet 5, such as a fabric sheet, having a superior appearance and a favorable touch, which is attached to a selected part of the surface of the surface skin member 3 to provide an ornamental effect to the door trim main body 4.

Figure 17:
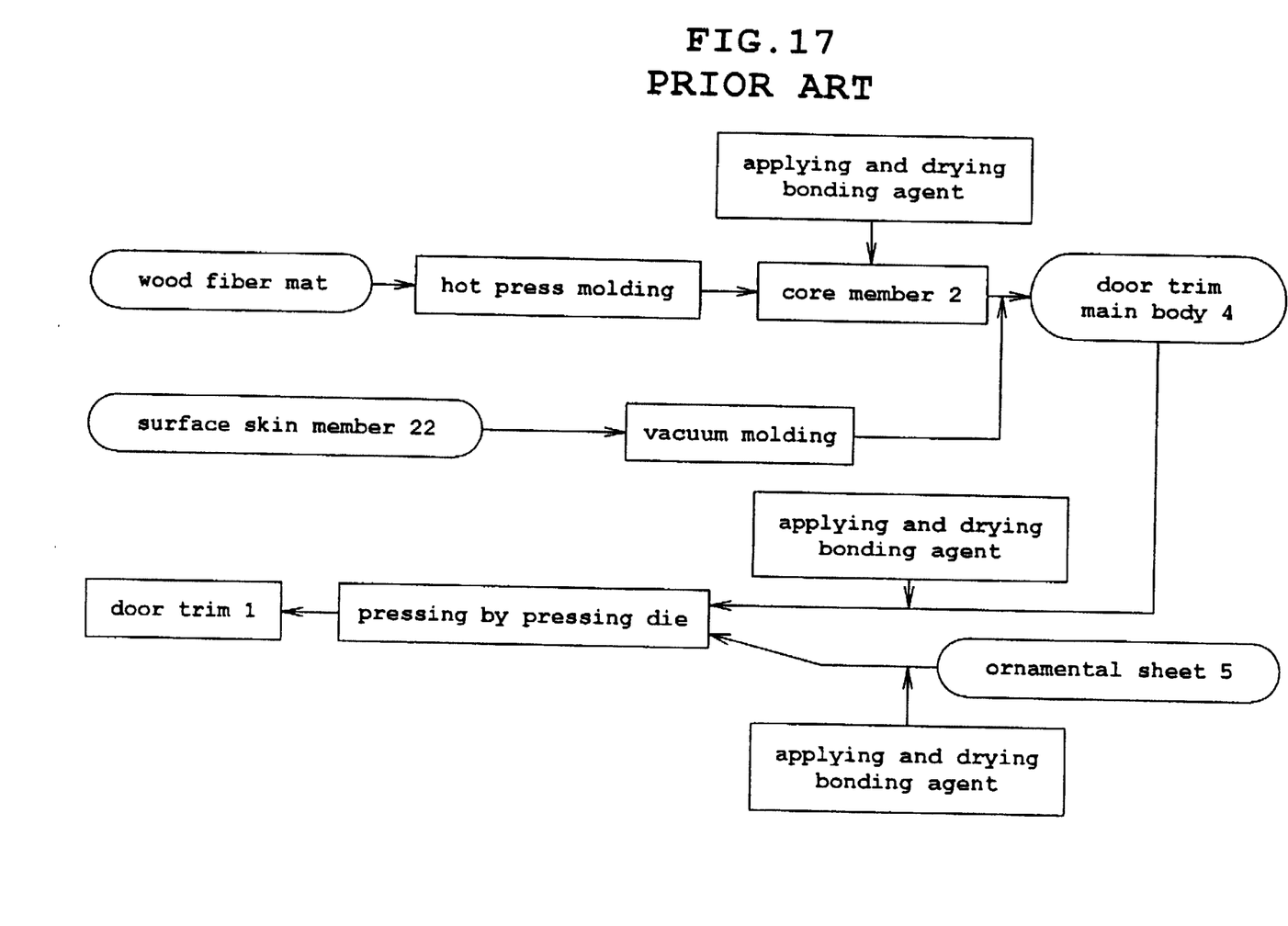
FIG. 17 is a flow chart showing different steps of the conventional method for making an automotive door trim.

The conventional method for making the door trim 1 is now described in the following with reference to the flow chart of FIG. 17.

A wood fiber mat impregnated with thermo-setting resin serving as a binder is press molded into a prescribed shape by using a hot press molding die assembly provided with a cavity of a prescribed shape to produce a core member 2 having a desired shape. Because this core member 2 is porous, a bonding agent is applied to the surface of the core member 2, and after the bonding agent has dried, the surface skin member 3 is integrally attached to the core member 2 by using a vacuum molding die assembly to complete the step of molding the door trim main body 4. Normally, the surface skin member 3 consists of a laminated sheet including a top surface layer 3a, for instance, made of a PVC sheet and lined with a foam layer 3b, for instance, made of polyethylene foam.

Then, a bonding agent is applied to a designated area (corresponding to the ornamental sheet 5) of the surface of the door trim main body 4, and is dried. Similarly, a bonding agent is applied to the reverse surface of the ornamental sheet 5, and is dried. The door trim main body 4 and the ornamental sheet 5 are then joined together by using a press die assembly, and the molding step for the door trim 1 is completed.

Figure 18:
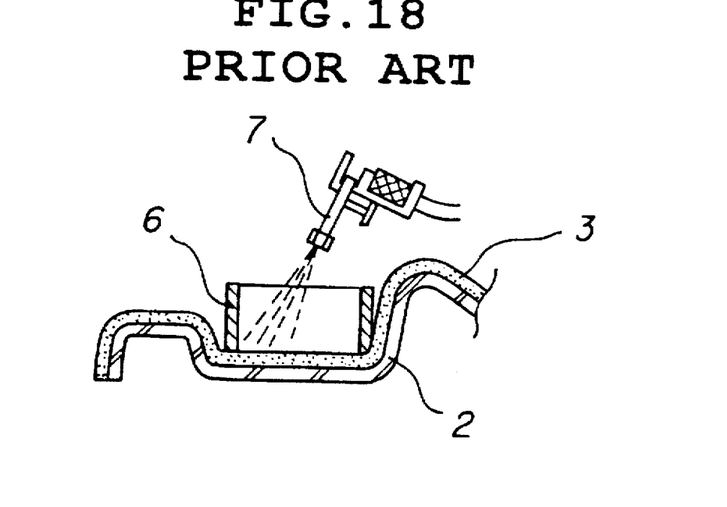
FIG. 18 is a sectional view illustrating the step of placing the mat in the die assembly for pressing according to the method of the present invention.
Figure 19:
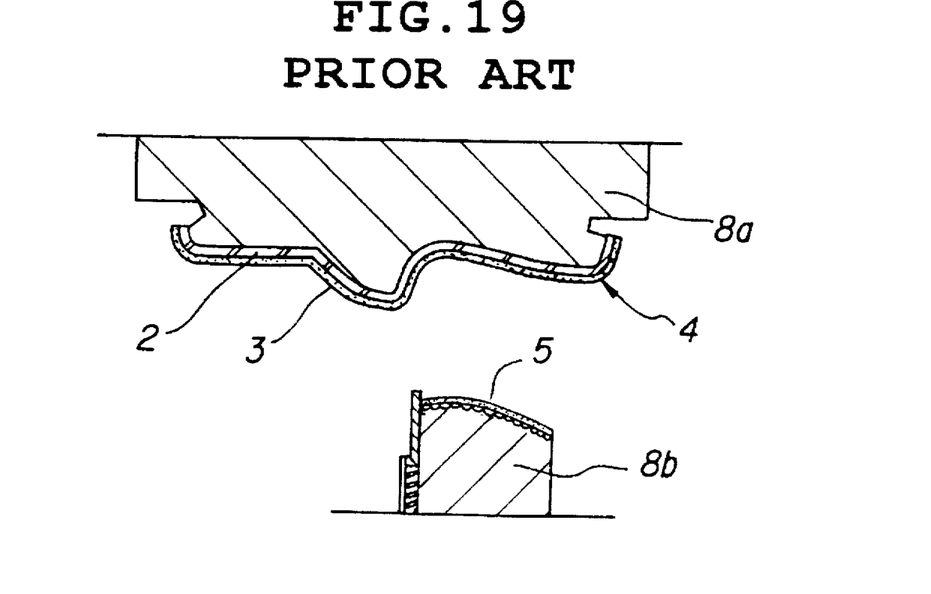
FIG. 19 is a sectional view illustrating the step of pressing the ornamental sheet to the door trim according to the conventional arrangement.

FIG. 18 shows the step of applying the bonding agent to the door trim main body 4 by using a spraying gun 7 while a mask 6 is placed over the surface area of the door trim main body 4 corresponding to the ornamental sheet 5. In the pressing step illustrated in FIG. 19, the door trim main body 4 and the ornamental sheet 5 are appropriately placed on the upper and lower dies 8a and 8b of the press die assembly, respectively, after the bonding agent is applied to each of them, and is dried, and the upper and lower dies 8a and 8b of the press die assembly are engaged with each other with the result that the ornamental sheet 5 is integrally attached to the door trim main body 4.

As described above, according to the conventional method for making door trims, it is necessary to apply a bonding agent to both the door trim main body 4 and the ornamental sheet 5, and to dry it, thereby involving a large number of manufacturing steps and increasing the fabrication cost. Also, the use of the bonding agent creates the problem of damaging the working environment.

Furthermore, because, after the bonding agent is applied to the ornamental sheet and then dried, the ornamental sheet 5 typically made of a fabric sheet is integrally joined to the door trim main body 4 by using a press die assembly 8a and 8b, the fibers of the fabric tends to be swept down, thereby creating the problem of adversely affecting the commercial acceptability thereof due to the loss of favorable appearance and touch.

The ornamental sheet 5 is required to be properly positioned relative to the door trim main body 4, and even a small offset of the ornamental sheet 5 relative to the door trim main body 4 will soil the surface of the product, thereby lowering the commercial value of the product.

BRIEF SUMMARY OF THE INVENTION

In view of such problems of the prior art, a primary object of the present invention is to provide automotive upholstery components which have an improved external appearance and are easy to fabricate.

A second object of the present invention is to provide automotive upholstery components which can be made without using any bonding agent, and is therefore free from the problem of soiling the surface of the finished product.

A third object of the present invention is to provide automotive upholstery components which can be made without using any bonding agent, and can therefore maintain the working area in a favorable condition with a minimum cost.

A fourth object of the present invention is to provide automotive upholstery components which can be fabricate without requiring any high precision.

A fifth object of the present invention is to provide a method for making such automotive upholstery components.

According to the present invention, such objects can be accomplished by providing an automotive upholstery component, comprising: a trim main body including a core member molded into a prescribed shape, and a surface skin member attached to a surface of the core member in an overlying relationship, the surface skin member including a top surface layer facing away from the core member and made of a low melting point resin sheet; and an ornamental sheet mounted on a selected area of a surface of the surface skin member, the ornamental sheet being attached to the surface skin member by passing high frequency electric current of a prescribed voltage between the trim main body and the ornamental sheet over an entire bonding surface thereof, and thereby softening the top surface layer of the surface skin member to serve the top surface layer as a bonding agent. The material of the core member and the molding process may be freely selected as long as the top surface layer of the surface skin member consists of a low melting point resin sheet.

By thus eliminating the need for a bonding agent to attach the ornamental sheet, the fabrication process is simplified, the working environment is improved, and soiling the ornamental sheet with the bonding agent or otherwise damaging the commercial acceptability of the product can be avoided. To conveniently conceal the edge of the ornamental sheet without substantially increasing the fabrication cost and without impairing the design characteristics of the upholstery component, the selected area of a surface of the surface skin member may define a recessed surface. Alternatively, a peripheral part of the selected area of a surface of the trim main body may be provided with an engagement groove which receives a peripheral edge of the ornamental sheet.

Preferably, the core member and the surface skin member of the trim main body are integrally molded by a mold press die assembly or by a cold press die assembly, and the core member and the surface skin member are thereby joined with each other by thermal welding. Thus, the use of a bonding agent can be entirely eliminated from the process of fabricating the upholstery component.

The upholstery component of the present invention can be fabricated by a method comprising the steps of: molding the trim main body into a prescribed shape with the surface skin member attached to a surface of the core member; placing the ornamental sheet on a first die half provided with a first electrode half extending over a die surface area corresponding to the ornamental sheet; placing the trim main body on a second die half provided with a second electrode half associated with the first electrode half; and engaging the first and second die halves and supplying high frequency electric current of a prescribed voltage between the first and second electrodes; whereby the top surface layer of a part of the surface skin member corresponding to the ornamental sheet is softened, and the ornamental sheet is attached to the trim main body in an overlying relationship with the top surface layer serving as a bonding agent.

The molding step for the trim main body may consist of a mold press molding process which essentially consists of placing the surface skin member in a molding die assembly, feeding material for the resin core member into the molding die assembly, and closing the molding die assembly to mold the resin core member into the prescribed shape, whereby the surface skin member is thermally welded onto the surface of the resin core member. Alternatively, the molding step for the trim main body may consist of a cold press molding process which essentially consists of placing a thermally softened resin core member and the surface skin member in a cold molding die assembly in an overlying relationship, and closing the cold molding die assembly to mold the resin core member into the prescribed shape, whereby the surface skin member is thermally welded onto the surface of the resin core member. According to these processes, the use of a bonding agent can be entirely eliminated from the process of fabricating the upholstery component. In either case, the peripheral part of the surface skin member can be favorably processed by softening a peripheral part of the reverse surface of the core member and/or a fringe part of the surface skin member by heating, and folding and wrapping the fringe part of the surface skin member around an edge of the core member toward the reverse surface thereof. Alternatively, a peripheral part of the surface skin member may be folded back along a periphery thereof around an edge of the core member and toward the reverse surface thereof, and is then ultrasonically welded to the core member.

It is also possible to use a vacuum molding process which essential consists of molding the core member made of porous material into the prescribed shape, applying a bonding agent to at least one of two opposing surfaces of the core member and the surface skin member, and attaching the surface skin member onto the core member by applying vacuum suction through the core member.

The peripheral edge of the ornamental sheet can be conveniently and economically concealed by pushing it into an engagement groove provided in the trim main body. This can be efficiently achieved when the first die half is provided with a push bar for pushing a peripheral part of the ornamental sheet into the groove when the first and second die halves are engaged with each other.

To ensure a favorable engagement between the first and second electrode halves, the first electrode half may be supported by a spring member on the first die half so as to be resiliently moveable in a direction of engaging the die halves while the push bar is fixedly secured to the first die half. Alternatively, the first electrode half along with the push bar may be supported by a spring member on the first die half so as to be resiliently moveable in a direction of engaging the die halves.

As can be understood from the above description, because the top surface layer of the surface skin member covering the trim main body consists of a low melting point thermoplastic resin sheet, by placing the trim main body and the ornamental sheet one over the other in the pressing die assembly, and feeding high frequency electric current of a prescribed voltage across the upper and lower electrodes, the top surface layer of the surface skin member is melted and allowed to infiltrate into the reverse surface of the ornamental sheet, and this ensures a strong attachment between the trim main body and the ornamental sheet.

Therefore, the bonding agent conventionally used for attaching the ornamental sheet to the trim main body is not required any more so that the steps of applying and drying the bonding agent can be eliminated, and the work area needed for applying the bonding agent can be abolished. By using a cold press molding or a mold press molding for molding the trim main body, the core member and the surface skin member can be integrally attached to each other by thermal welding, and the need for the bonding agent can be entirely eliminated for making the product. When fabric such as cloth is used for the ornamental sheet, because the need for the conventional drying and pressing steps can be eliminated, the favorable quality of the cloth can be maintained.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
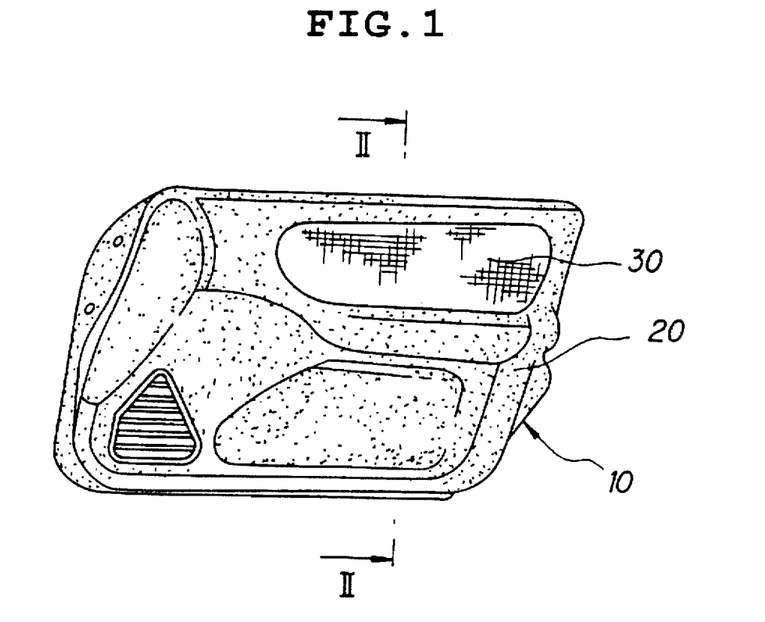
FIG. 1 is an external view showing an automotive door trim given as an embodiment of the automotive upholstery component according to the present invention.
Figure 2:
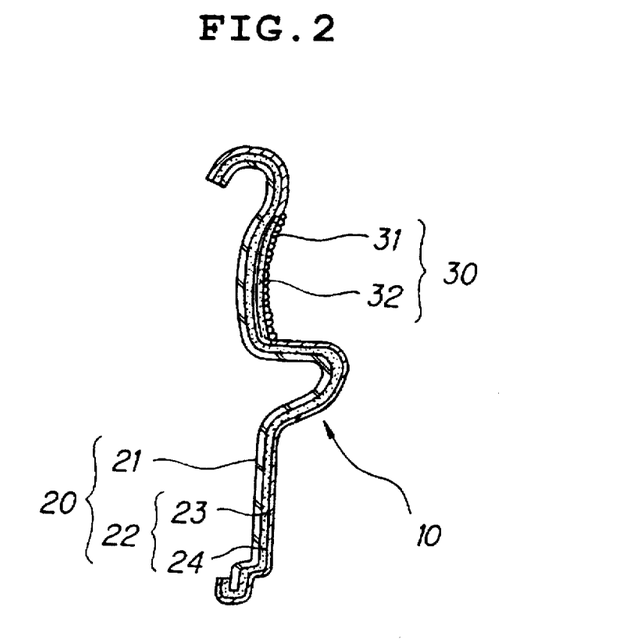
FIG. 2 is a sectional view taken along line II—II of FIG. 1.

Referring to FIGS. 1 and 2 showing a first embodiment of the present invention, the automotive door trim 10 essentially consists of a door trim main body 20 molded into a desired curved shape, and an ornamental sheet 30 attached to a selected surface area of the door trim main body 20. More specifically, the door trim main body 20 consists of a core member 21 which is molded into a prescribed shape by hot press molding a wood fiber mat M impregnated with a binder consisting of thermo-setting resin such as phenol resin, and a surface skin member 22 which is integrally attached to the surface of the core member 21 by virtue of the porosity of the core member 21. The surface skin member 21 is provided with a laminated structure consisting of a top surface layer 23 consisting of a low melting point resin sheet such as a PVC sheet, and a foam lining layer 24 made of a material having a suitable cushioning property such as polypropylene foam and polyethylene foam. Low melting point as used herein is intended to mean the property of the material, typically a synthetic resin material, to soften or otherwise become adhesive to such an extent as to become capable of attaching to an adjoining member when pressed against it at a relatively low temperature.

The ornamental sheet 30 comprises a fabric sheet, having suitable design characteristics such as velvet, jersey, tricot and moquette, which is lined with a padding layer 32 made of polyurethane foam or the like, and is intended to give an improved design effect to the product by virtue of the contrast in texture between the surface skin member 22 and the ornamental sheet 30.

The present invention is characterized by the fact that the ornamental sheet is entirely attached to the door trim main body 20 by high frequency welding, and provides the following advantages. The work steps are reduced and simplified by eliminating the steps of applying a bonding agent and drying it. The working environment is improved by virtue of the elimination of the use of the bonding agent. The texture of the fabric sheet 31 is kept in a favorable condition by eliminating the need for heating and pressing the fabric sheet during the conventionally required step of drying the bonding agent. The fabrication cost can be substantially reduced owing to the substantial reduction in the fabrication steps. The appearance and design characteristics of the fabric sheet can be improved owing to the prevention of the flattening of the fabric sheet and the soiling of the fabrication sheet, and the working environment can be improved owing to the elimination of the use of the bonding agent.

In particular, when the bonding surface of the door trim main body 20 presents a curved concave surface when attaching the ornamental sheet 30 to the door trim main body 20, because the entire surface of the ornamental sheet 20 can be closely and firmly attached to the door trim main body 20, the entire surface of the ornamental sheet 30 can be attached to the door trim main body 20 in a substantially firmer fashion as compared to the conventional method of welding only the peripheral part of the ornamental sheet 30.

Figure 3:
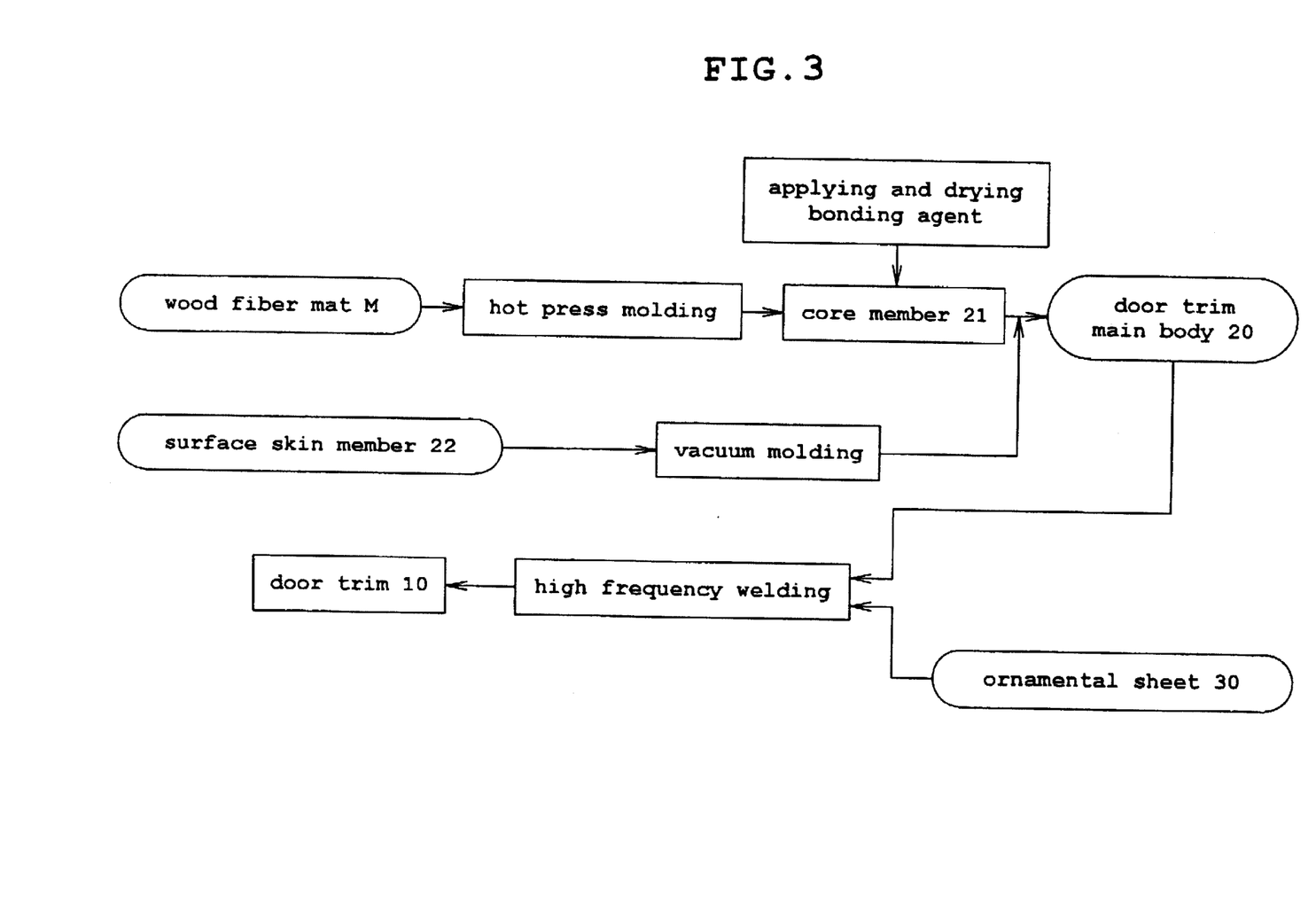
FIG. 3 is a flow chart showing different steps of the method of the present invention.

The fabrication process of the automotive door trim 10 is briefly described in the following with reference to the flow chart of FIG. 3. First of all, as a molding step for the core member 21, the core member 21 is molded into a prescribed shape by hot press molding a wood fiber mat M impregnated with a thermo-setting resin binder, and after a bonding agent is applied to the front surface of the core member 21, the surface skin member 22 is integrally attached to the surface of the core member 21 by vacuum molding, to thereby complete the step of molding the door trim main body 20.

Then, the door trim main body 20 and the ornamental sheet 30 are integrally joined together by high frequency welding, to thereby complete the step of molding the door trim main body 20.

The different steps of the process of fabricating the door trim 10 are described in more detail with reference to FIGS. 4 to 9.

Figure 4:
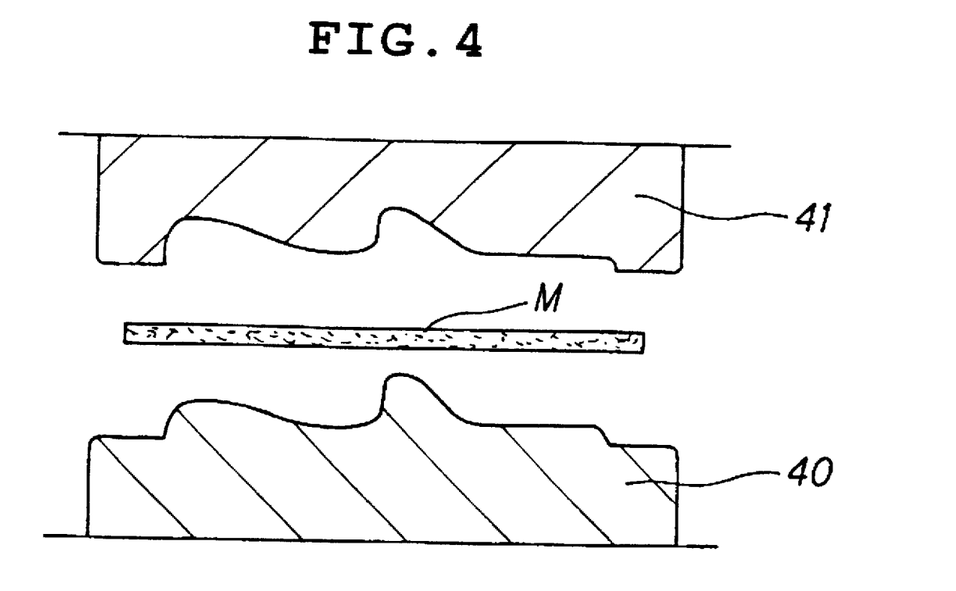
FIG. 4 is a sectional view illustrating the step of placing the mat in the die assembly for pressing according to the method of the present invention.
Figure 5:
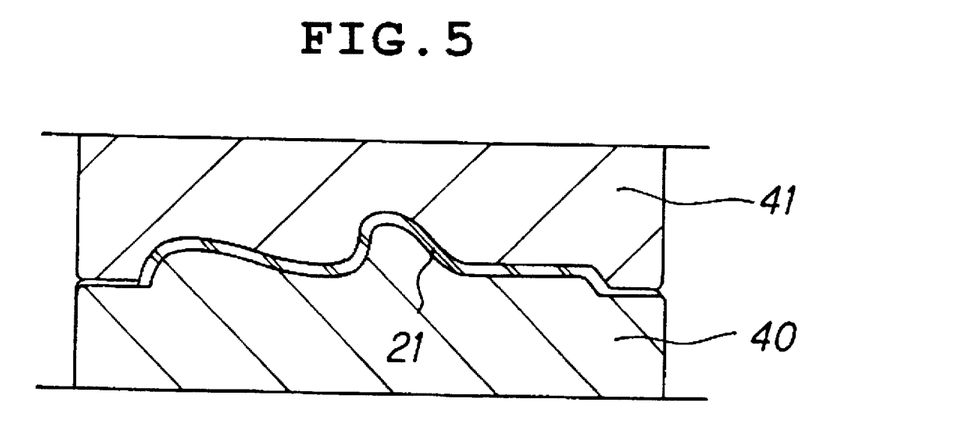
FIG. 5 is a sectional view illustrating the step of molding the core member according to the method of the present invention.

First described is the step of molding the core member 21 with reference to FIGS. 4 and 5. As illustrated in FIG. 4, a wood fiber mat M impregnated with thermo-setting resin, serving as the material for the resin core member 21, is placed between upper and lower mold dies 40 and 41 for hot press molding in an open state. The upper die 41 for hot press molding is lowered by a prescribed stroke as illustrated in FIG. 5, and the mat M is molded into the resin core member 21 of the prescribed curved shape by the upper and lower dies 40 and 41 for hot press molding. The molding conditions for this hot molding process includes the die temperature of 220° C., and the hot press molding time of 50 seconds.

Thereafter, a bonding agent is applied to the surface of the core member 21, and is then dried so that it may be used for firmly attaching the core member 21 and the surface skin member 22 together.

Figure 6:
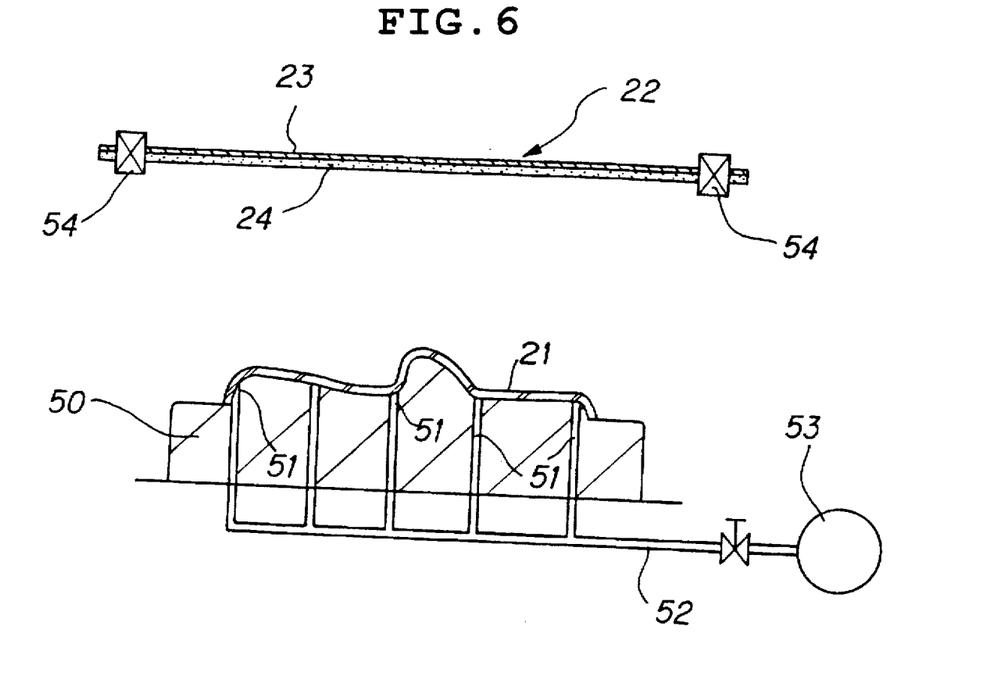
FIG. 6 is a sectional view illustrating the step of placing the core member in the die assembly for vacuum molding according to the method of the present invention.
Figure 7:
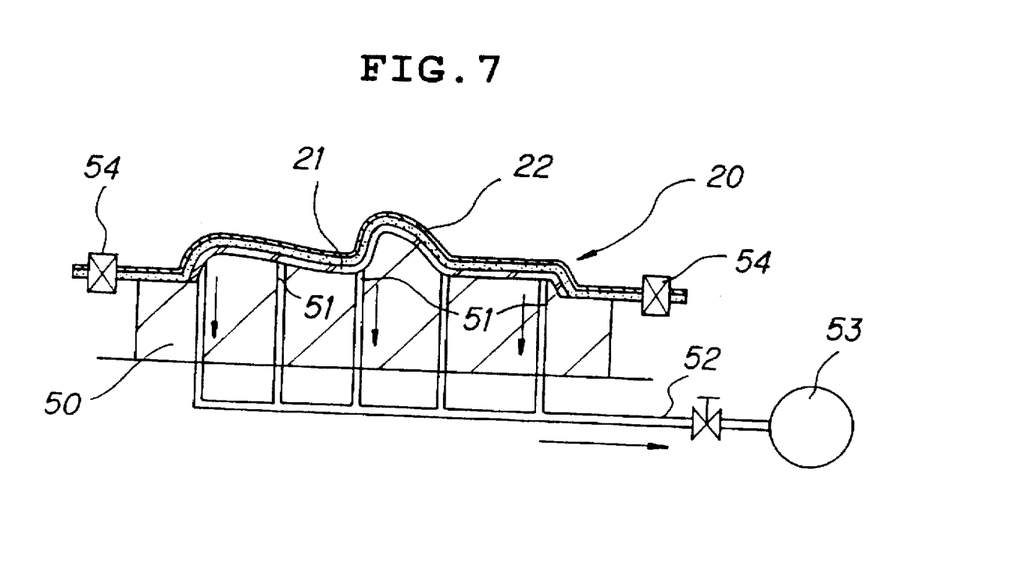
FIG. 7 is a sectional view illustrating the step of attaching the surface skin member to the core member by the vacuum molding process according to the method of the present invention.

FIGS. 6 and 7 illustrate the step of attaching the surface skin member 22 by a vacuum bonding step, wherein the core member 21 molded in the preceding step is placed on the die surface of the die assembly 50 for vacuum molding as illustrated in FIG. 6. The die assembly 50 for vacuum molding is provided with vacuum suction holes 51 arranged in the die surface thereof, and these holes 51 communicate with a vacuum pump 53 via a conduit 52. The peripheral part of the surface skin member 22 is retained by a clamping device 54 above the core member 21 which is in turn placed on the die assembly 50 for vacuum molding.

As illustrated in FIG. 7, the die assembly 50 for vacuum molding is lifted by a lifting mechanism not shown in the drawings, and the surface skin member 22 having its peripheral part retained by the clamping device 54 is overlaid over the core member 21 so that the surface skin member 22 may be closely and integrally attached to the surface of the core member 21 by evacuating the air gap between the core member 21 and the surface skin member 22 via the vacuum suction holes 51.

Above described was the step of molding the door trim main body 20, but it is also possible to mold press mold or cold press mold the door trim main body 20, and then integrally join the core member 21 and the surface skin member 22 together.

Figure 20:
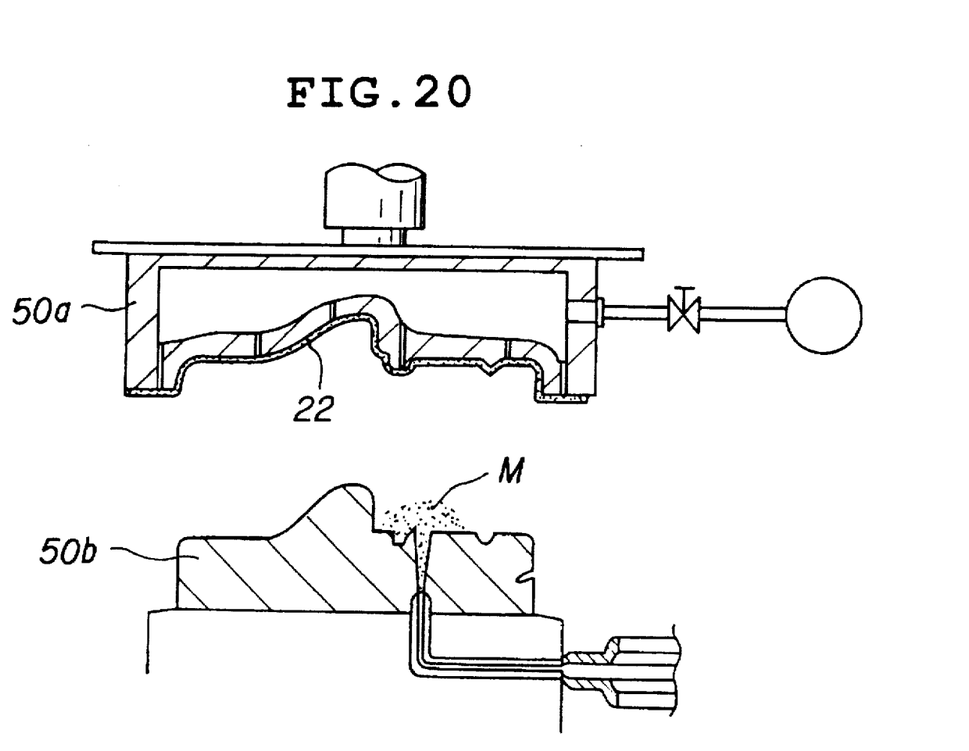
FIG. 20 is a sectional view illustrating an alternate arrangement for integrally molding the core member with the surface skin member of the trim main body according to the method of the present invention.

For instance, when the mold press molding process is employed, composite polypropylene resin material having 90 weight parts of polypropylene resin and 10 weight parts of talc may be used as the material for the core member 21, and, as illustrated in FIG. 20, while the die assembly for mold press molding is open, the surface skin member 22 consisting of a PVC resin sheet lined with polyethylene foam is placed in the upper die 50a of the die assembly for mold press molding. Then, the upper die 50a for mold press molding is lowered by a prescribed stroke, and when the upper and lower dies 50a and 50b are partly closed, leaving a prescribed clearance therebetween, the composite polypropylene resin material M in semi-molten state is fed to prescribed locations of the die surface of the lower die 50b for mold press molding. The upper die 50a is then lowered to its bottom center point, and the core material 21 is mold press molded into a prescribed shape while the surface skin member 22 is thermally and integrally welded to the surface of the core member 21. This completes the molding process for the door trim main body 20.

The peripheral part of the reverse surface of the core member 21 and/or the folded fringe part of the surface skin member is softened by blowing hot air thereto, and the folded part of the surface skin member 22 is wrapped around the edge of the core member 21 toward the reverse surface thereof. Therefore, no bonding agent is required for attaching the core member and the surface skin member 22, and the processing of the peripheral part also does not require any bonding agent so that the need for a bonding agent is entirely eliminated from the molding step and the periphery processing step for the door trim main body 20.

Figure 21:
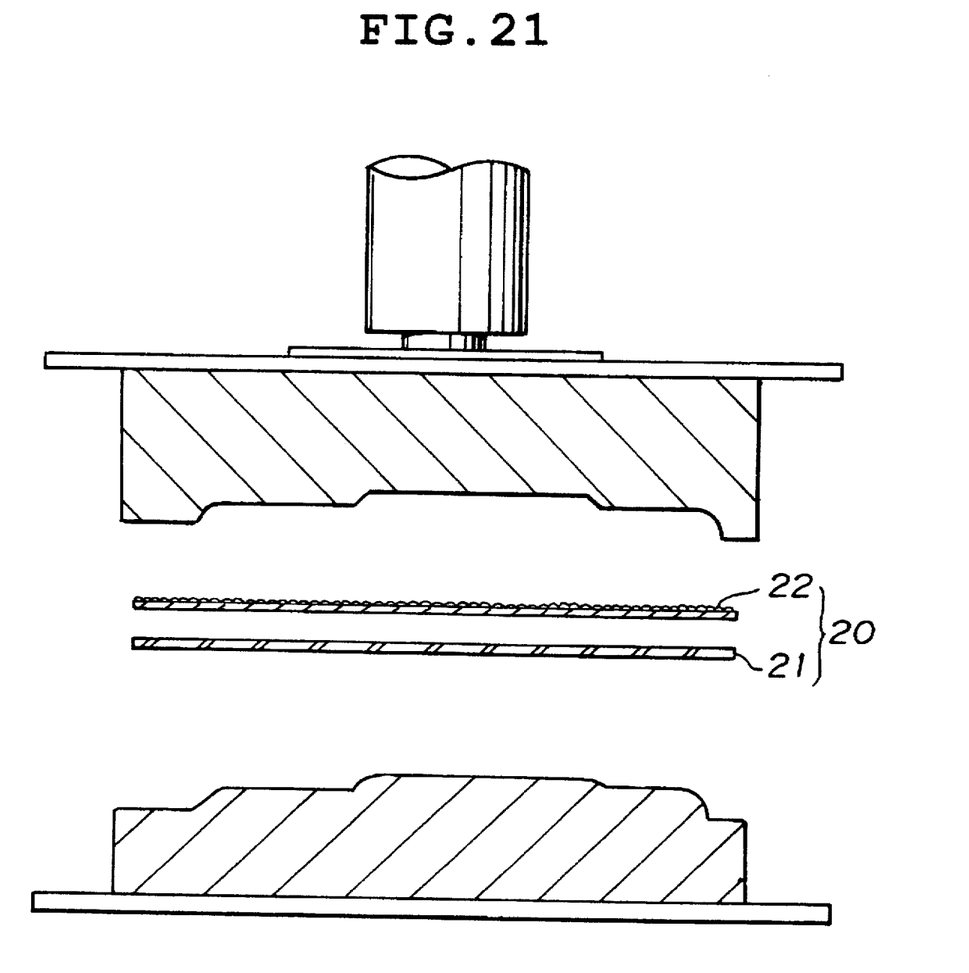
FIG. 21 is a sectional view illustrating another alternate arrangement for integrally molding the core member with the surface skin member of the trim main body according to the method of the present invention.

Similarly, cold press molding process may also be employed as illustrated in FIG. 21. When cold press molding the door trim main body 20, composite polypropylene including polypropylene resin and a wood powder filter mixed at a suitable ratio may be employed as the material for the core member 21, and the surface skin member 22 may consist of a foamed PVC sheet which is lined with a fabric sheet. More specifically, the polypropylene resin mixed with wood powder is extruded into a sheet from a T die extruder, and this blank sheet is softened by heating it to a prescribed temperature before it is placed in the die assembly for cold press molding as the softened material for the core member 21. The surface skin member 22 having its peripheral part retained by a clamping device is placed on the surface of the material for the core member 21. The upper and lower dies for cold press molding are engaged with each other so that the core member 21 is molded into a prescribed shape while the surface skin member 22 is integrally attached to the surface of the core member 21 by thermal welding.

In this cold press molding process also, in addition to trimming the peripheral part of the core member 21, the surface skin member 22 is cut out in a slightly oversized dimensions, and is folded back along the periphery thereof around the edge of the core member 21 and toward the reverse surface thereof. The folded back portion is then ultrasonically welded to the core member 21, thereby simplifying the edge process for the door trim main body, and eliminating the need for a bonding agent during the molding process for the door trim main body in a similar manner as the case of mold press molding. This edge process is equally applicable to the trim main body formed by mold press molding as described above. Similarly, the edge process previously described in connection with the mold press molding can also be applied to the door trim main body formed by cold press molding.

Figure 8:
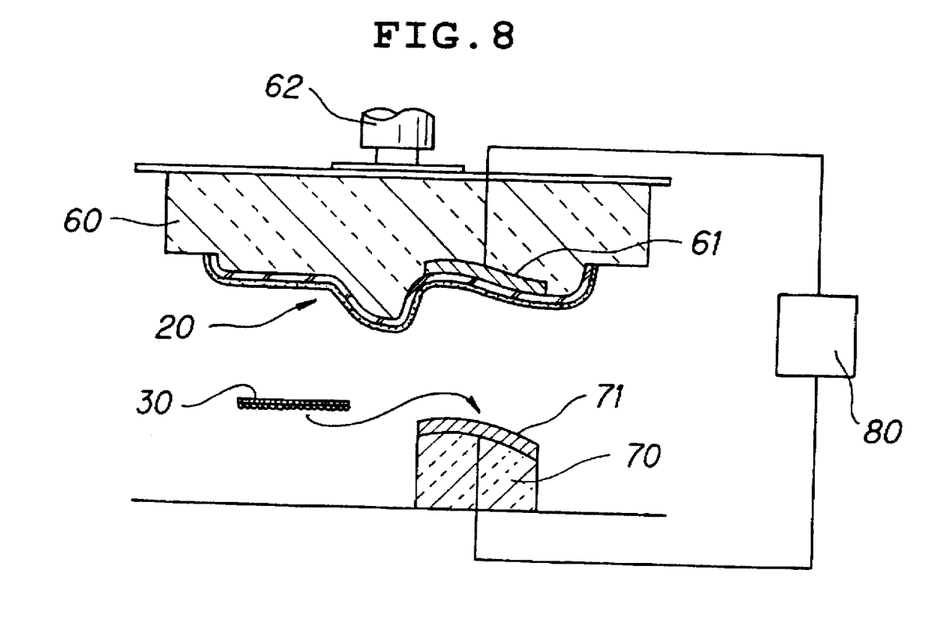
FIG. 8 is a sectional view illustrating the manner in which the door trim main body and the ornamental sheet are placed in the die assembly in the pressing step of the method of the present invention.
Figure 9:
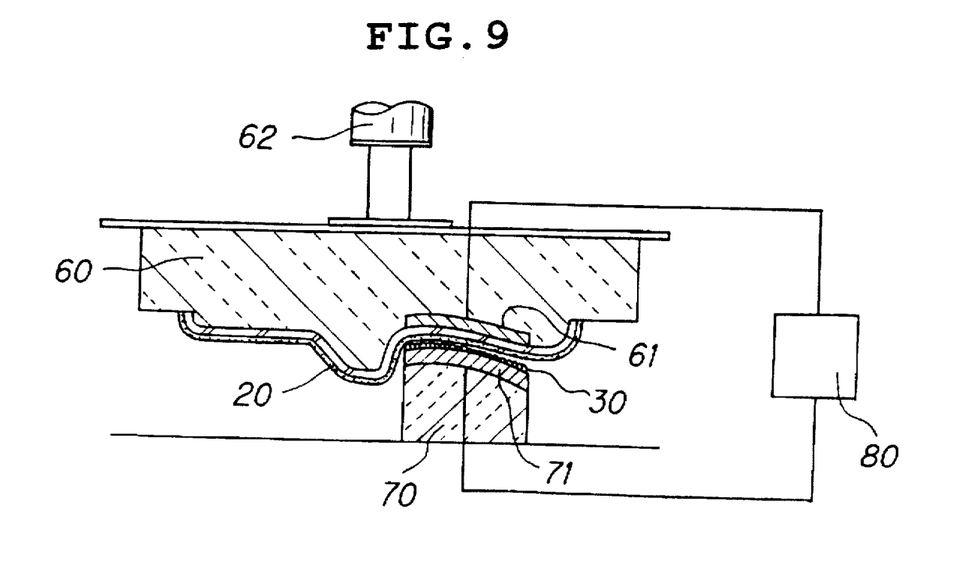
FIG. 9 is a sectional view illustrating the step of high frequency welding according to the method of the present invention.

FIGS. 8 and 9 illustrate essential points of the present invention, or the step of mounting the ornamental sheet 30 onto the door trim main body 20.

Referring to FIG. 8, between upper and lower dies 60 and 70 for pressing are disposed a welder upper electrode 61 and a welder lower electrode 71 so as to define parts of the dies surfaces of the upper and lower dies 60 and 70, respectively, and the two electrodes 61 and 71 are connected to a high frequency oscillator 80.

After the door trim main body 20 is placed on the upper die 60 for pressing, and the ornamental sheet 30 is placed on the lower die 70 for pressing, the upper die 60 for pressing is lowered by a prescribed stroke by means of the actuation of a lifting cylinder 62 of the upper die 60 for pressing as illustrated in FIG. 9 so that the door trim main body 20 and the ornamental sheet 30 are joined with each other by the upper and lower dies 60 and 70 for pressing. The upper and lower dies 60 and 70 for pressing are closed upon each other with the press time period of 7 seconds and the press pressure of 2,750 kgf while high frequency electric current of 1 to 2 A and 8,800 to 12,000 volts is applied across the upper and lower electrodes 61 and 71.

At this point, because the top surface layer 23 of the surface skin member 22 of the door trim main body 20 is made of a low melting point resin sheet such as a PVC sheet, the top surface layer 23 melts over the entire surface of the ornamental sheet 30 with the result that the molten resin infiltrates into small gaps inside the padding layer 32 of the ornamental sheet 30, and the ornamental sheet 30 is thereby firmly anchored to the door trim main body 20.

According to the method of the present invention, when mounting the ornamental sheet 30 on a prescribed part of the door trim main body 20, the two parts are secured to each other not by using a bonding agent but by high frequency welding over the entire contact area so that the elimination of the need for a bonding agent not only allows the steps of applying and drying the bonding agent to be eliminated, but also the working environment can be improved, and the appearance of the product can be improved by preventing the soiling of the surface of the product with the bonding agent.

When the door trim main body 20 is molded by mold press molding or cold press molding, the molding process for the door trim main body 20 can be made without requiring any bonding agent, and the fabrication of the door trim 10 can be made entirely free from the use of a bonding agent.

Furthermore, because the cloth 31 of the fabric sheet 30 is not required to be pressed with any significant pressure, as conventionally practiced following the step of drying the bonding agent, the surface of the cloth 31 is not flattened, and the ornamental sheet 30 having superior appearance and touch can be firmly attached to a prescribed part of the surface of the door trim main body 20.

Figure 10:
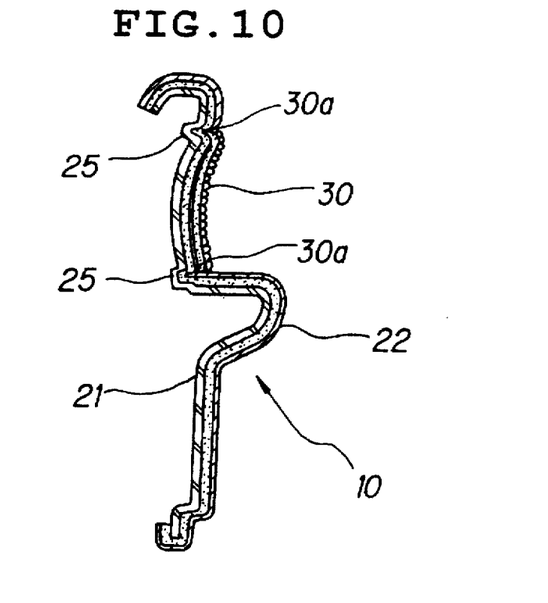
FIG. 10 is a sectional view illustrating a modified embodiment of the automotive upholstery component according to the present invention constructed as an automotive door trim.

FIG. 10 shows a modified embodiment of the automotive door trim 10, which is not different from the first embodiment in that it consists of a door trim main body 20 and an ornamental sheet 30, but the door trim main body 20 is provided with an engagement groove 25 for engaging a peripheral edge 30a of the ornamental sheet 30 therein to enhance the appearance of the peripheral edge of the ornamental sheet 30 by concealing it in the engagement groove 25.

Figure 11:
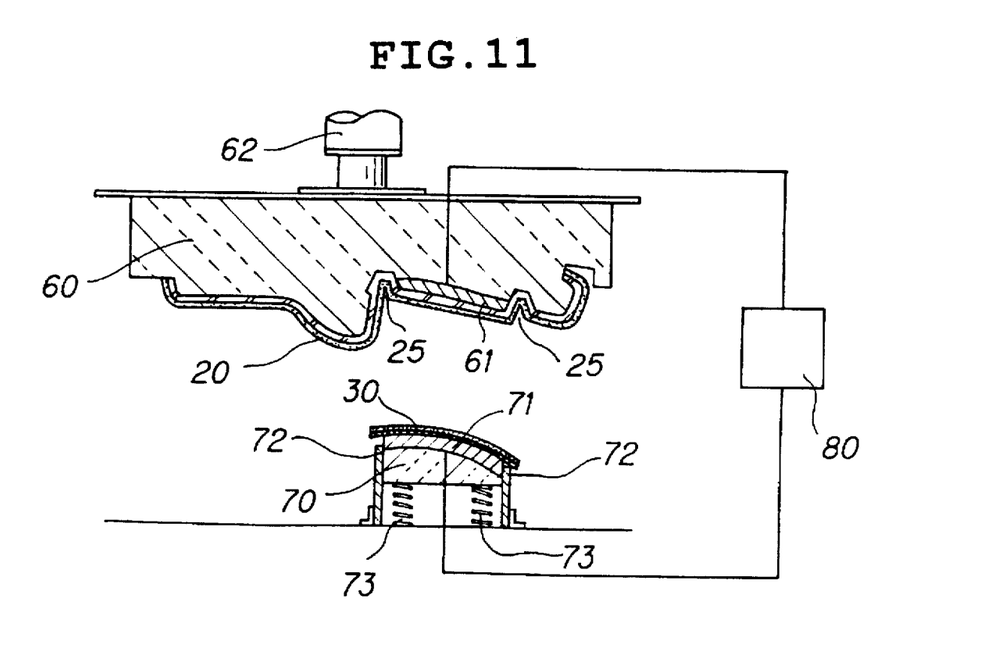
FIG. 11 is a sectional view illustrating the step of pressing for the door trim shown in FIG. 10.

With regard to the door trim 10 illustrated in FIG. 10, the ornamental sheet 30 is mounted on the door trim main body 20 by using a push bar 72 which is provided around the outer periphery of the lower die 70 for pressing as illustrated in FIG. 11, and the lower die 70 for pressing is disposed vertically moveable by way of spring members 73 consisting of oil springs or the like. The electric current supplied from the high frequency welder is applied to a shoulder of the engagement groove 25, and the peripheral edge 30a that is to be pushed into the engagement groove 25 is pushed into the engagement groove 25 by the push bar 72, and is welded to the door trim main body 20.

In this embodiment also, the entire area of the ornamental sheet 30, with the exception of the peripheral edge 30a which is to be pushed into the engagement groove 25 of the door trim main body 20, is welded to the door trim main body 20. This embodiment provides the same advantage as the first embodiment, and additionally facilitates the work involved in attaching the ornamental sheet because of the increased tolerance in the positional accuracy of the ornamental sheet 30 that is placed on the lower die 70 for pressing. A slight offsetting of the ornamental sheet 30 is accommodated by the peripheral part of the ornamental sheet 30 that is pushed into the engagement groove 25, and would not adversely affect the external appearance of the product. This also contributes to the increase in the productivity.

Other modified embodiments of the present invention are described in the following with reference to FIGS. 12 to 15.

Figure 12:
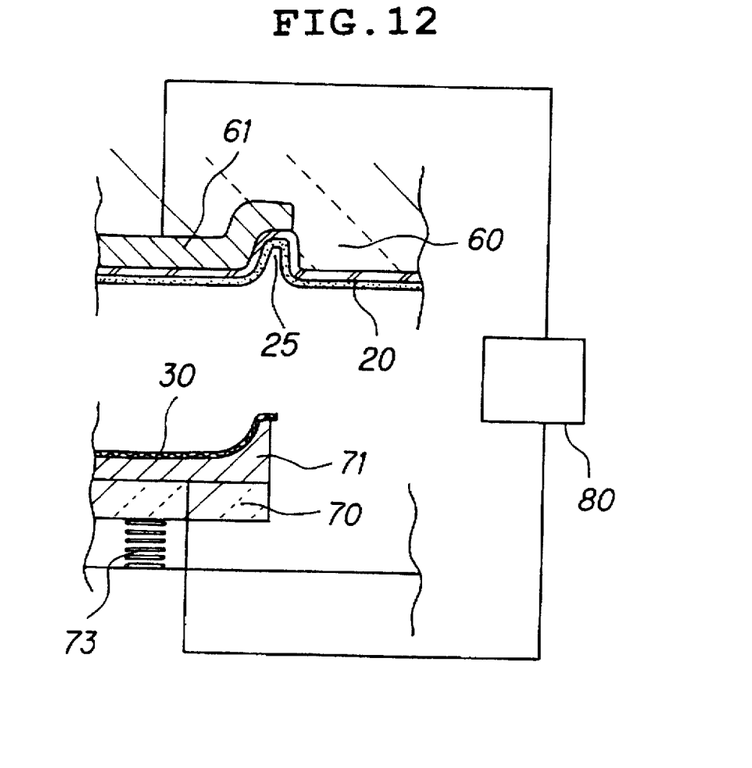
FIG. 12 is a sectional view illustrating a modified embodiment of the die assembly for pressing used in the step of pressing for the door trim shown in FIG. 10.
Figure 13:
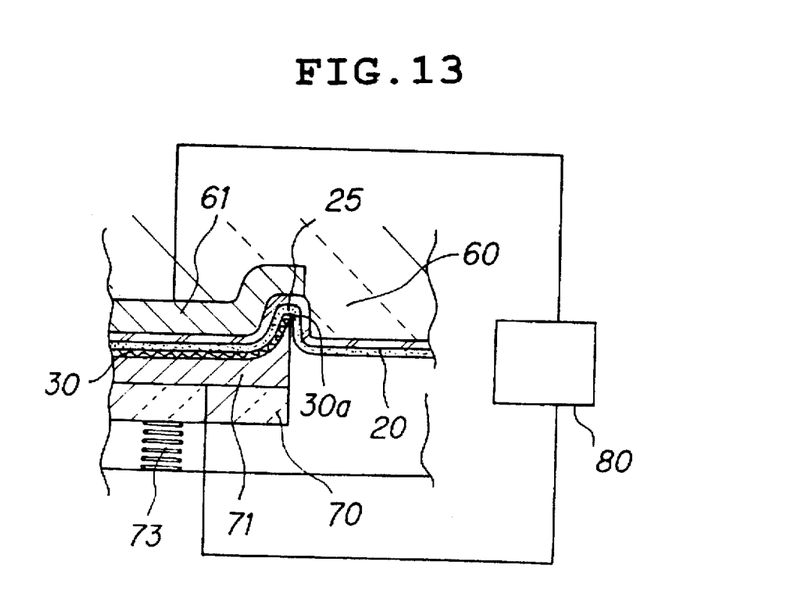
FIG. 13 is a sectional view illustrating the step of pressing for the door trim using the die assembly for pressing shown in FIG. 12.

The modified embodiment illustrated in FIGS. 12 and 13 involves the use of an integral electrode, and the die surface of the lower die 70 for pressing is itself provided with the push bar 72.

Figure 14:
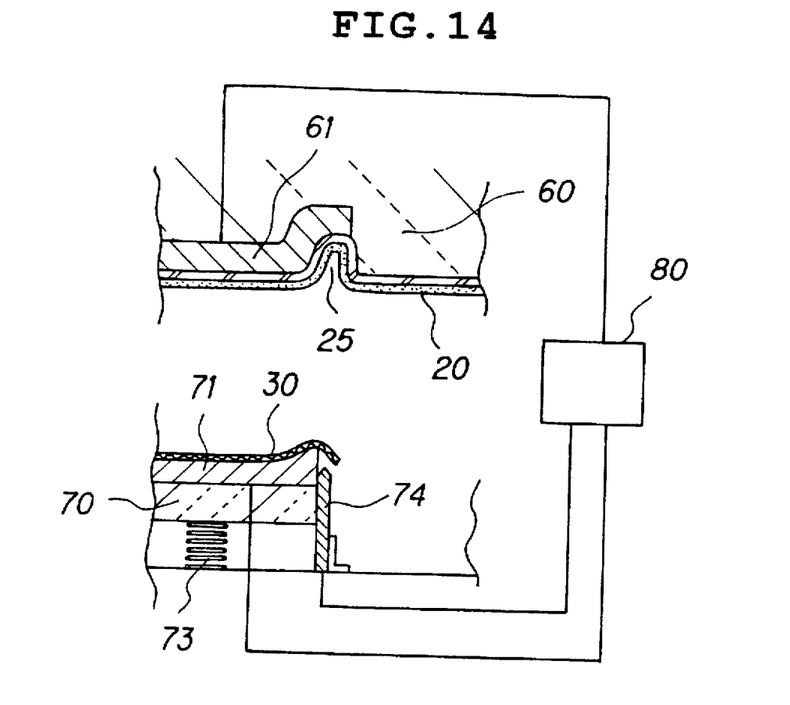
FIG. 14 is a sectional view illustrating another modified embodiment of the die assembly for pressing used in the step of pressing for the door trim shown in FIG. 10.
Figure 15:
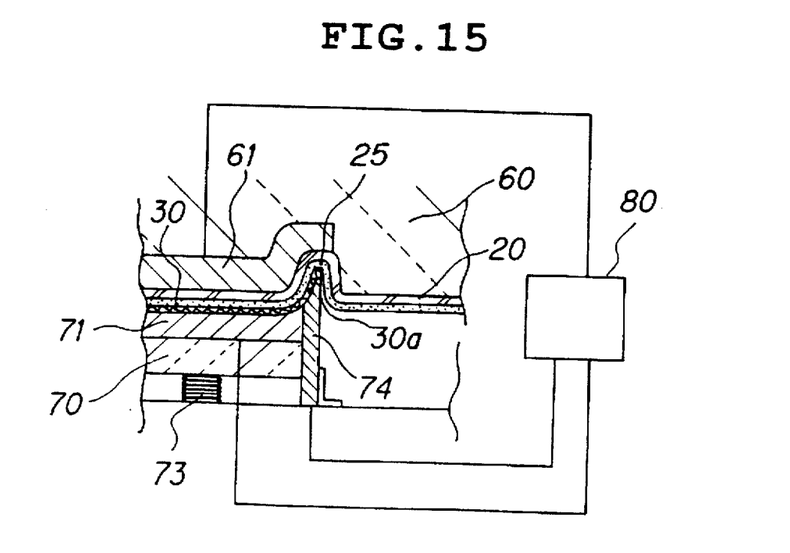
FIG. 15 is a sectional view illustrating the step of pressing for the door trim using the die assembly for pressing shown in FIG. 14.

The modified embodiment illustrated in FIGS. 14 and 15 involves the use of a separate electrode, and the electrode for the push bar 72 is provided on the outer periphery of the lower die 70 for pressing.

In the above described embodiments also, because the peripheral edge 30a of the ornamental sheet 30 that is pushed into the engagement groove 25 is welded to the inner walls of the engagement groove 25, the strength of attachment of the ornamental sheet 30 to the door trim main body is extremely high.

Thus, the main advantages of the present invention may be summarized as given in the following.

(1) Because the present invention is characterized by the welding of the ornamental sheet onto a prescribed part of the surface of the trim main body over the entire interface therebetween, the bonding agent which has been conventionally used for attaching the ornamental sheet to the trim main body can be eliminated, and the elimination of the steps of applying and drying the bonding agent allows the fabrication steps to be reduced, and the floor areas required for applying the bonding agent and drying the bonding agent can be saved. These factors contribute to the reduction of the fabrication cost.

(2) Because the present invention is characterized by the welding of the ornamental sheet onto a prescribed part of the surface of the trim main body over the entire interface therebetween, the bonding agent, which was conventionally required for attaching the ornamental sheet to the trim main body, can be eliminated, and the working environment can be thereby improved.

(3) Because the present invention is characterized by the welding of the ornamental sheet onto a prescribed part of the surface of the trim main body over the entire interface therebetween, the flattening of the ornamental sheet, which was conventionally inevitable due to the application of a bonding agent to the reverse surface of the ornamental sheet and the drying of the boding agent, is avoided, and the commercial value of the product can be increased owing to the favorable design characteristics of the ornamental sheet.

(4) Conventionally, the trim main body and the ornament sheet were attached to each other by applying a bonding agent to both the opposing surfaces, and the bonding agent often soiled the surface of the product. However, according to the present invention which is characterized by the welding of the ornamental sheet onto a prescribed part of the surface of the trim main body over the entire interface therebetween, such soiling of the surface of the product with the bonding agent can be avoided, and the external appearance of the product can be improved.

(5) According to an embodiment of the present invention which is characterized by the welding of the ornamental sheet onto a prescribed part of the surface of the trim main body over the entire interface therebetween, and by the engagement of the peripheral part of the ornamental sheet in the engagement groove of the trim main body by using the push bar, small positional errors in placing the ornamental sheet on the lower die for pressing can be accommodated by the peripheral part of the ornamental sheet which is pushed into the engagement groove whereby the work efficiency in mounting the ornamental sheet can be improved, and the productivity can be increased.

What we claim is:

1. An automotive upholstery component, comprising:
   a trim main body including a core member molded into a prescribed shape, and a surface skin member attached to a surface of said core member in an overlying relationship, said surface skin member including a top surface layer facing away from said core member; and
   an ornamental sheet attached to a selected area of a surface of said surface skin member, said ornamental sheet capable of being attached to said surface skin member by passing high frequency electric current of a prescribed voltage between said trim main body and said ornamental sheet over an entire bonding surface thereof, and said top surface layer of said surface skin member being capable of softening in response to said high frequency current and serving as a bonding agent;

wherein said top surface sheet is made of a low melting point resin sheet which softens at a lower temperature than the one at which said ornamental sheet softens.

2. An automotive upholstery component according to claim 1, wherein said selected area of a surface of said surface skin member defines a recessed surface.

3. An automotive upholstery component according to claim 1, wherein a peripheral part of said selected area of a surface of said trim main body is provided with an engagement groove which receives a peripheral edge of said ornamental sheet.

4. An automotive upholstery component according to claim 1, wherein said core member and said surface skin member of said trim main body are integrally molded by a mold press die assembly whereby said core member and said surface skin member are thereby joined with each other by thermal welding.

5. An automotive upholstery component according to claim 4, wherein a peripheral part of the reverse surface of said core member and/or a fringe part of said surface skin member is softened by heating, and said fringe part of said surface skin member is folded and wrapped around an edge of said core member toward said reverse surface thereof.

6. An automotive upholstery component according to claim 4, wherein a peripheral part of said surface skin member is folded back along a periphery thereof around an edge of said core member and toward the reverse surface thereof, and is then ultrasonically welded to said core member.

7. An automotive upholstery component according to claim 1, wherein said core member and said surface skin member of said trim main body are integrally molded by a press die assembly whereby said core member and said surface skin member are joined with each other by thermal welding.

8. An automotive upholstery component according to claim 7, wherein a peripheral part of the reverse surface of said core member and/or a fringe part of said surface skin member is softened by heating, and said fringe part of said surface skin member is folded and wrapped around an edge of said core member toward said reverse surface thereof.

9. An automotive upholstery component according to claim 7, wherein a peripheral part of said surface skin member is folded back along a periphery thereof around an edge of said core member and toward the reverse surface thereof, and is then ultrasonically welded to said core member.

10. A method for making an automotive upholstery component as defined in claim 1, comprising the steps of:
   molding said trim main body into a prescribed shape with said surface skin member attached to a surface of said core member;
   placing said ornamental sheet on a first die half provided with a first electrode half extending over a die surface area corresponding to said ornamental sheet;
   placing said trim main body on a second die half provided with a second electrode half associated with said first electrode half; and
   engaging said first and second die halves and supplying high frequency electric current of a prescribed voltage between said first and second electrodes;
   whereby said top surface layer of a part of said surface skin member corresponding to said ornamental sheet is softened, and said ornamental sheet is attached to said trim main body in an overlying relationship with said top surface layer serving as a bonding agent.

11. A method for making an automotive upholstery component according to claim 10, wherein said molding step for said trim main body consists of placing said surface skin member in a molding die assembly, feeding material for said resin core member into said molding die assembly, and closing said molding die assembly to mold said resin core member into the prescribed shape, whereby said surface skin member is thermally welded onto the surface of said resin core member.

12. A method for making an automotive upholstery component according to claim 11, wherein a peripheral part of the reverse surface of said core member and/or a fringe part of said surface skin member is softened by heating, and said fringe part of said surface skin member is folded and wrapped around an edge of said core member toward said reverse surface thereof.

13. A method for making an automotive upholstery component according to claim 11, wherein a peripheral part of said surface skin member is folded back along a periphery thereof around an edge of said core member and toward the reverse surface thereof, and is then ultrasonically welded to said core member.

14. A method for making an automotive upholstery component according to claim 10, wherein said molding step for said trim main body consists of placing a thermally softened resin core member and said surface skin member in a cold molding die assembly in an overlying relationship, and closing said cold molding die assembly to mold said resin core member into the prescribed shape, whereby said surface skin member is thermally welded onto the surface of said resin core member.

15. A method for making an automotive upholstery component according to claim 14, wherein a peripheral part of the reverse surface of said core member and/or a fringe part of said surface skin member is softened by heating, and said fringe part of said surface skin member is folded and wrapped around an edge of said core member toward said reverse surface thereof.

16. A method for making an automotive upholstery component according to claim 14, wherein a peripheral part of said surface skin member is folded back along a periphery thereof around an edge of said core member and toward the reverse surface thereof, and is then ultrasonically welded to said core member.

17. A method for making an automotive upholstery component according to claim 10, wherein said molding step for said trim main body consists of molding said core member made of porous material into said prescribed shape, applying a bonding agent to at least one of two opposing surfaces of said core member and said surface skin member, and attaching said surface skin member onto said core member by applying vacuum suction through said core member.

18. A method for making an automotive upholstery component according to claim 10, wherein said trim main body is provided with an engagement groove around a surface area of said trim main body corresponding said ornamental sheet, and said first die half is provided with a push bar for pushing a peripheral part of said ornamental sheet into said groove when said first and second die halves are engaged with each other.

19. A method for making an automotive upholstery component according to claim 18, wherein said first electrode half is supported by a spring member on said first die half so as to be resiliently moveable in a direction of engaging said die halves while said push bar is fixedly secured to said first die half.

20. A method for making an automotive upholstery component according to claim 18, wherein said first electrode half along with said push bar is supported by a spring member on said first die half so as to be resiliently moveable in a direction of engaging said die halves.

* * * * *